F. G. LORENZEN.
METHOD OF PREPARING FOOD PRODUCTS OF STARCHY MATERIAL.
APPLICATION FILED MAR. 30, 1918.

1,275,711.

Patented Aug. 13, 1918.

UNITED STATES PATENT OFFICE.

FREDERICK G. LORENZEN, OF BATTLE CREEK, MICHIGAN, ASSIGNOR TO KELLOGG TOASTED CORN FLAKE COMPANY, OF BATTLE CREEK, MICHIGAN, A CORPORATION OF MICHIGAN.

METHOD OF PREPARING FOOD PRODUCTS OF STARCHY MATERIAL.

1,275,711.  Specification of Letters Patent.  Patented Aug. 13, 1918.

Application filed March 30, 1918. Serial No. 225,815.

*To all whom it may concern:*

Be it known that I, FREDERICK G. LORENZEN, a subject of the Emperor of Germany, residing at Battle Creek, in the county of Calhoun and State of Michigan, U. S. A., have invented certain new and useful Improvements in Methods of Preparing Food Products of Starchy Material, of which the following is a specification.

In my prior Patent No. 1,211,462, granted to me on January 9, 1917, I have described a certain cooked and puffed food product composed of globules or pellets of starchy material gelatinized by cooking with steam and puffed by the application of heat. The object of my present invention is to improve upon the process described in my said prior patent, and to this end I have devised certain modifications and developments of that process whereby greater certainty and uniformity in securing the desired results are attained, and the most perfect product possible is obtained. My invention consists in the various modifications and novel steps in the process of making said product which are hereinafter described, and which are more particularly pointed out in the appended claims.

Figure 1:
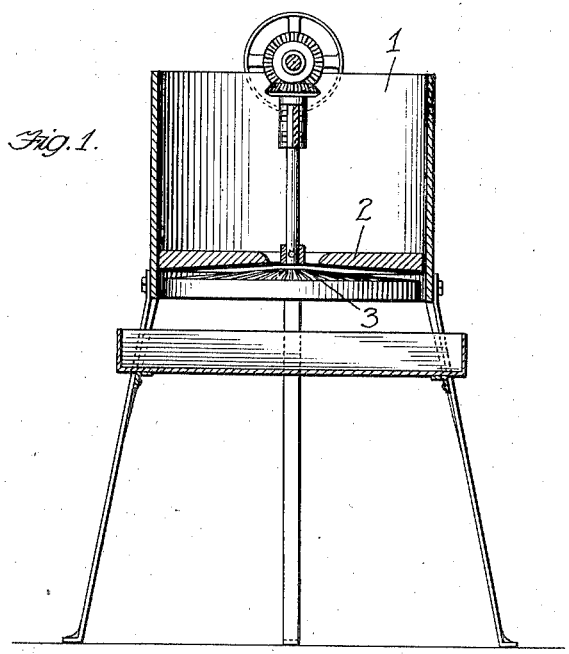
Figure 2:
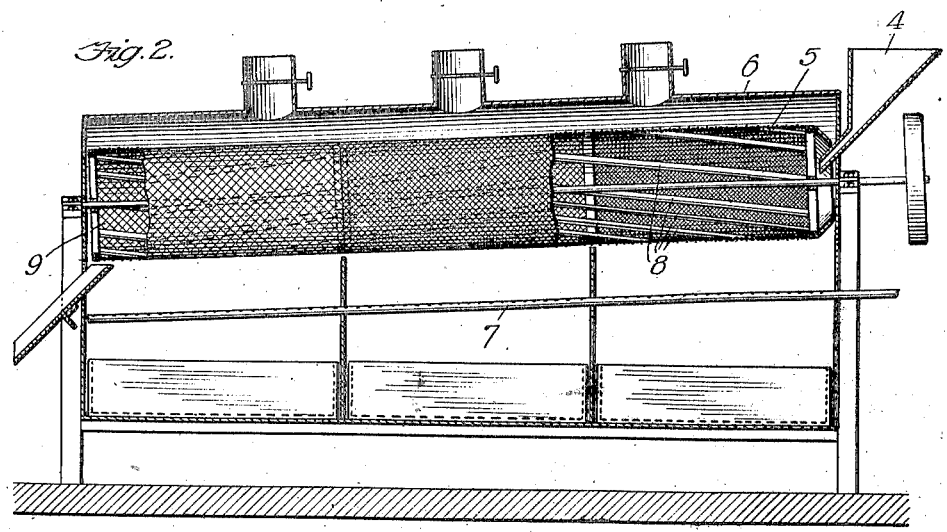

Of the drawings Figure 1 represents a central vertical section of a crumbling or separating mill suitable for use in practising my invention, and Fig. 2 a central vertical section of a suitable puffing oven for puffing the cooked and dried pellets of material.

The method of preparing the globules of raw starch material preparatory to cooking it by steam is the same as that followed in the process of my prior patent. It will therefore suffice to say that the new powdered starchy material used as a base is treated with water to form a stiff, friable mass, which by a suitable flaking mill or other appliance is reduced to a flaky, granulated mass which is operated upon by a tumbling drum to convert the granulated material to a mass of polished, free-running globules which are graded into lots of uniform sizes.

Describing now the modified process of cooking and puffing these globules, they are placed in suitable trays in a steam oven where the cooking is begun with dry superheated steam at an initial pressure of from one-half pound to a pound per square inch. The cooking is continued for a period of about three hours, whereby the globules are completely gelatinized, the pressure being increased from time to time at the rate of about five pounds an hour, so that at the conclusion of the third hour the cooking is being accomplished under a pressure of about fifteen pounds. This gradual increase in temperature has been found to prevent the globules from becoming sticky and soggy, and coalescing to the extent that would take place without such treatment. The trays are now removed from the oven and allowed to stand about twenty-four hours at ordinary room temperature to cool and slightly dry the cooked mass.

After the preliminary cooling and drying, the mass of globules, divided into pieces of convenient size for treatment, is next subjected to the operation of a separating or crumbling mill, such as that illustrated in Fig. 1 of the drawings. This mill consists of a hopper 1, within which is rotatably mounted an upper radially-grooved grinding plate 2 arranged above a fixed lower plate 3 having a coöperating upper face. The distance between these plates is accurately adjusted so that by the rotation of the upper plate the globules (which have retained their form and have a rubber-like texture but are slightly adherent) are separated, but not crushed or ground up.

The globules are next placed inside a room in which the temperature can be regulated, and the temperature gradually raised to a point ranging from 100 to 110 degrees Fahrenheit. From three to five days' exposure in this drying room will be required to properly dry the globules, the time varying according to the temperature employed.

After the final drying has been accomplished the globules are conveyed directly into the puffing machine without being allowed to cool, it having been found that if permitted to cool the globules tend to split and crack, and that such broken globules will not puff properly. A suitable puffing machine is illustrated in Fig. 2 of the drawing, by reference to which it will be seen that the warm globules are introduced through an inlet 4 into the upper end of an inclined revoluble screen drum 5 arranged within a housing 6 to retain the heat supplied by a burner 7. The drum is provided with spiral agitating strips 8, and made in sections varying in dimensions of mesh so that the unpuffed globules will be sorted out at the lower end of the drum as the product travels toward the outlet 9. By the sharp, dry heat of the puffing oven the globules are puffed during their travel through the drum, and the finished product is delivered at the outlet 9 of the machine.

I claim:

1. The process of forming a puffed food product from globules of starchy material such as described which consists in subjecting said globules to the action of dry steam at an initial low pressure and increasing said pressure during the cooking operation whereby adhesion of globules to each other is diminished, afterward separating and drying said globules, and then subjecting them to a sharp dry heat whereby they are puffed.

2. A process according to claim 1 in which the initial pressure is less than two pounds per square inch and the final pressure between ten and twenty pounds and the time of cooking is between two and four hours.

3. The process of forming a puffed food product from globules of starchy material such as described which consists in subjecting said globules to the action of dry steam at an initial low pressure and increasing said pressure during the cooking operation whereby adhesion of globules to each other is diminished, then initially drying said globules in the mass, then separating them, then subjecting them to gradual drying at a warm temperature, and then subjecting them without cooling to a sharp dry heat whereby they are puffed.

4. A process according to claim 3 in which the final drying temperature is gradually brought up to a point of from 100 to 110 degrees.

5. The process of forming a puffed food product from globules of starchy material such as described which consists in subjecting said globules to the action of dry steam at an initial low pressure and increasing said pressure during the cooking operation whereby adhesion of globules to each other is diminished, then initially drying said globules at ordinary room temperature in the mass, then separating them, then subjecting them to a gradually-increased and warmer temperature until thoroughly dry, and then subjecting them without cooling to a sharp dry heat whereby they are puffed.

6. A process according to claim 5 in which the final drying is accomplished in from three to five days at a temperature of from 100 to 110 degrees.

7. The process of forming a puffed food product from globules of starchy material such as described which consists in subjecting said globules to the action of dry steam until they are completely gelatinized, then initially drying and then separating the globules, then subjecting them for several days to the action of a drying room at a warm temperature and then subjecting them without cooling to the action of a puffing oven.

8. The process of forming a puffed food product from globules of starchy material such as described which consists in subjecting said globules to the action of dry steam until they are completely gelatinized, then initially drying and then separating the globules, then subjecting them for several days to the action of a drying room at a temperature gradually brought up to from 100 to 110 degrees, and then subjecting them without cooling to the action of a puffing oven.

9. The process of forming a puffed food product from globules of starchy material such as described which consists in subjecting said globules to the action of dry steam until they are completely gelatinized, then cooling and slightly drying the mass of cooked globules, then subjecting the mass to the grinding action of a pair of separated crumbling plates whereby the globules are separated, and then drying and puffing the globules.

FREDERICK G. LORENZEN.